(12) United States Patent
Tamura et al.

(10) Patent No.: US 10,464,120 B2
(45) Date of Patent: Nov. 5, 2019

(54) METHOD FOR PRODUCING FORGED CRANKSHAFT

(71) Applicant: NIPPON STEEL & SUMITOMO METAL CORPORATION, Tokyo (JP)

(72) Inventors: Kenji Tamura, Takatsuki (JP); Junichi Okubo, Amagasaki (JP); Ken Yoshino, Guangdong (CN); Kunihiro Yabuno, Matsubara (JP); Hiroyuki Kurokawa, Nishinomiya (JP); Tomohisa Yamashita, Suita (JP); Sho Takamoto, Osaka (JP); Koichiro Ishihara, Kyoto (JP)

(73) Assignee: NIPPON STEEL CORPORATION, Tokyo (JP)

( * ) Notice: Subject to any disclaimer, the term of this patent is extended or adjusted under 35 U.S.C. 154(b) by 295 days.

(21) Appl. No.: 15/531,788

(22) PCT Filed: Dec. 10, 2015

(86) PCT No.: PCT/JP2015/006155
§ 371 (c)(1),
(2) Date: May 31, 2017

(87) PCT Pub. No.: WO2016/092850
PCT Pub. Date: Jun. 16, 2016

(65) Prior Publication Data
US 2018/0078994 A1   Mar. 22, 2018

(30) Foreign Application Priority Data

Dec. 10, 2014 (JP) .................................. 2014-250396
Dec. 25, 2014 (JP) .................................. 2014-263640

(51) Int. Cl.
B21J 5/02 (2006.01)
B21K 1/08 (2006.01)
F16C 3/08 (2006.01)

(52) U.S. Cl.
CPC ........ B21J 5/02 (2013.01); B21K 1/08 (2013.01); F16C 3/08 (2013.01)

(58) Field of Classification Search
CPC ................. B21J 5/02; F16C 3/08; B21K 1/08
See application file for complete search history.

(56) References Cited

FOREIGN PATENT DOCUMENTS

| JP | 2002-273541 | 9/2002 |
| JP | 2007-071227 | 3/2007 |
| JP | 2009-197929 | 9/2009 |
| JP | 2010-230027 | 10/2010 |
| JP | 2010-255834 | 11/2010 |

(Continued)

Primary Examiner — Moshe Wilensky
(74) Attorney, Agent, or Firm — Clark & Brody

(57) ABSTRACT

A method for producing a forged crankshaft includes a die forging step of forming a forged blank having a crankshaft shape by die forging, and a pressing step of pressing the forged blank by a first dies. The forged blank includes first excess portions attached to some or all of crank arms each incorporating a counterweight, each of the first excess portions protrudes from a side portion of the crank arm, in a region near a journal. In the pressing step, the first excess portions are deformed by the first dies such that each of the first excess portions bulges toward a pin. This facilitates the production of a forged crankshaft with a reduced weight and assured stiffness.

9 Claims, 15 Drawing Sheets

(56) References Cited

FOREIGN PATENT DOCUMENTS

| | | |
|---|---|---|
| JP | 2012-007726 | 1/2012 |
| JP | 2014-040856 | 3/2014 |
| WO | 2014/038183 | 3/2014 |
| WO | 2014/091738 | 6/2014 |

IIIC–IIIC

IVB-IVB

VC-VC

XIA-XIA

XIB-XIB

XVC-XVC

XVIB-XVIB

METHOD FOR PRODUCING FORGED CRANKSHAFT

TECHNICAL FIELD

The present invention relates to a method for producing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, die forged crankshafts (which will hereinafter be referred to as forged crankshafts) are often employed.

A forged crankshaft is generally produced by using a billet as a starting material. The billet has a circular or square cross section, and the cross sectional area is constant throughout the length. A method for producing a forged crankshaft includes a preforming step, a die forging step, and a trimming step. After the trimming step, a coining step may be performed if needed. Typically, the preforming step includes a rolling step and a bending step, and the die forging step includes a rough forging step and a finish forging step.

FIGS. 1A to 1F are schematic diagrams illustrating a conventional production process for producing a forged crankshaft. The crankshaft 1 illustrated in FIG. 1F is a four-cylinder eight-counterweight crankshaft to be mounted in a four-cylinder engine. The crankshaft 1 comprises five journals J1 to J5, four pins P1 to P4, a front part Fr, a flange Fl, and eight crank arms (hereinafter referred to simply as "arms") A1 to A8. The eight arms A1 to A8 connect the journals J1 to J5 respectively to the pins P1 to P4. The eight arms A1 to A8 have counterweights (hereinafter referred to simply as "weights") W1 to W8, respectively. The weights W1 to W8 are integrally formed with the arms A1 to A8, respectively.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights.

According to the production method shown in FIGS. 1A to 1F, the forged crankshaft 1 is produced in the following manner. First, a billet 2 with a predetermined length as shown in FIG. 1A is heated in a heating furnace or a gas atmosphere furnace and then undergoes rolling. In the rolling step, the billet 2 is rolled and drawn by grooved rolls, for example, to distribute its volume in the longitudinal direction, whereby a rolled blank 3, which is an intermediate material, is formed (see FIG. 1B). Next, in the bending step, the rolled blank 3 is partially pressed in a direction perpendicular to the longitudinal direction to distribute its volume, whereby a bent blank 4, which is a secondary intermediate material, is formed (see FIG. 1C).

Next, in the rough forging step, the bent blank 4 is press forged by a pair of upper and lower dies, whereby a rough forged blank 5 is formed (see FIG. 1D). The rough forged blank 5 has a general shape of the crankshaft (final product). Then, in the finish forging step, the rough forged blank 5 is further press forged by a pair of upper and lower dies, whereby a finish forged blank 6 is formed (see FIG. 1E). The finish forged blank 6 has a shape in agreement with the shape of the crankshaft that is a final product. In the rough forging and the finish forging, excess material flows out from between the mutually opposed parting surfaces of the dies, thereby forming flash. Therefore, the rough forged blank 5 and the finish forged blank 6 have large flash B around the shape of the crankshaft.

In the trimming step, while the finish forged blank 6 with flash is held by a pair of dies, the flash is punched by a cutting die. Thereby, the flash B is removed from the finish forged blank 6. In this manner, a finish forged blank with no flash is obtained, and the finish forged blank has almost the same shape as the forged crankshaft 1 shown in FIG. 1F.

In the coining step, principal parts of the forged blank with no flash are slightly pressed by dies from above and below and shaped to have the correct size and shape of the final product. In this regard, the principal parts of the forged blank with no flash are, e.g., shaft parts such as the journals J, the pins P, the front part Fr and the flange Fl, and in some cases the arms A and the weights W. In this manner, the forged crankshaft 1 is produced.

The production process shown in FIGS. 1A to 1F is applicable not only for producing a 4-cylinder 8-counterweight crankshaft as illustrated in FIG. 1F but also for producing various other types of crankshafts. For example, the production process is applicable for producing a 4-cylinder 4-counterweight crankshaft.

In a 4-cylinder 4-counterweight crankshaft, some of the eight arms A have weights W integrated therewith. For example, the leading first arm A1, the trailing eighth arm A8, and the two central arms (the fourth arm A4 and the fifth arm A5) each have a weight W integrated therewith. The other arms, and specifically, the second, the third, the sixth and the seventh arms A2, A3, A6 and A7 have no weights, and these arms are oval. In the following paragraphs, such an arm with no weight will be sometimes referred to as "non-weight arm".

Also, the same production process can be applied for producing crankshafts that are to be mounted in a 3-cylinder engine, an inline 6-cylinder engine, a V-type 6-cylinder engine, an 8-cylinder engine and the like. It is noted that, when adjustment of the placement angles of the pins is necessary, a twisting step is added after the trimming step.

In recent years, there has been a need for weight reduction of reciprocating engines, particularly those for motor vehicles, in order to improve the fuel economy. Accordingly, there is also an ever-increasing demand for weight reduction of crankshafts to be mounted in reciprocating engines.

A conventional way to reduce the weight of a forged crankshaft is providing a recessed portion in a pin-facing surface of an arm incorporating a weight. The recessed thin portion is formed by die forging, and therefore, the recessed thin portion extends in a direction perpendicular to the parting plane of the dies, that is, in a direction perpendicular to the pin decentering direction and reaches both side surfaces of the arm. This is disclosed in Japanese Patent Application Publication No. 2009-197929 (Patent Literature 1) and Japanese Patent Application Publication No. 2010-255834 (Patent Literature 2).

In the crankshaft disclosed in Patent Literature 1, the recessed thin portion extends in a direction perpendicular to the pin decentering direction and reaches both side surfaces of the arm. In the recessed portion, at least in a region that is less distant from the pin than the axis of the journal, the depth of the recess increases gradually with increasing distance from the pin and decreasing distance from the journal. Also, the bottom of the recessed portion is formed to be along the outer periphery of an imaginary cylinder. The imaginary cylinder extends from the joint surface of the pin and the arm (web) to the joint surface of the journal and the arm (web). According to Patent Literature 1, this allows for weight reduction without causing a reduction in the stiffness of the crankshaft.

In the crankshaft disclosed in Patent Literature 2, a thin portion is formed in a pin-facing surface of an arm, and the thin portion extends toward the journal to an imaginary line. The imaginary line is a straight line passing the axis of the journal in a region between the periphery of the thrust bearing of the pin and the periphery of the thrust bearing of the journal. The thin portion extends in a direction perpendicular to the parting plane of the dies, that is, in a direction perpendicular to the pin decentering direction, and reaches both side surfaces of the arm. According to Patent Literature 2, because of the thin portion, the arm bends when a reciprocating motion of a piston puts a load on the pin, and therefore, the stress is dispersed, thereby lengthening the life of the pin. Patent Literature 2 teaches that providing a recessed portion allows for a reduction in weight.

Another conventional way to reduce the weight of a forged crankshaft is making a hole by punching. This is disclosed in Japanese Patent Application Publication No. 2012-7726 (Patent Literature 3) and Japanese Patent Application Publication No. 2010-230027 (Patent Literature 4).

Patent Literatures 3 and 4 teach an arm having a hole made in the journal-facing surface and teach a method for producing a crankshaft with the arm. The hole of the arm is made to lie on a straight line connecting the axis of the journal and the axis of the pin (which will be hereinafter referred to as "arm centerline"), and the hole extends large and deep toward the pin. This arm is reduced in weight by the weight corresponding to the volume of the hole. The weight reduction of the arm leads to a weight reduction of the weight paired with the arm, thereby resulting in a reduction in weight of the whole forged crankshaft. In the region of the arm near the pin, the both side portions of the arm are thick, which ensures the stiffness (both torsional rigidity and flexural rigidity). The both side portions of the arm mean the surfaces at edges in the arm width direction (in the direction perpendicular to the pin decentering direction) and therearound.

Forming a recessed portion in the journal-facing surface of the arm while keeping the both side portions of the arm thick as described above ensures both weight reduction and stiffness.

It is, however, difficult to produce such a forged crankshaft with such arms having a unique shape by a conventional production method. The reason is as follows. When a recess is to be formed in the surface of an arm in the die forging step, the draft of the die will become a reverse draft at the site of the recess, and therefore the formed forged blank will not be able to be removed from the die.

To avoid such situations, in the production methods disclosed in Patent Literatures 3 and 4 are configured as follows. In the die forging step, the arm is shaped to be small with no recess formed in the surface of the arm, and after the trimming step, a punch is pushed into the surface of the arm to form a recess.

In the crankshaft shown in FIG. 1F, all of the arms A and the weights W incorporated therewith have the same shape. Practically, however, the arms A and the weights W integrated therewith may be different from one another in shape as needed. Japanese Patent Application Publication No. 2007-71227 (Patent Literature 5) and Japanese Patent Application Publication No. 2014-40856 (Patent Literature 6) disclose techniques for this.

Patent Literature 5 discloses a 4-cylinder 8-counterweight crankshaft including a flywheel disposed at an end. In the crankshaft, the arms incorporating a weight are different from one another in the thickness and the center of gravity of the arm and in the mass of the weight. Accordingly, it is possible to reduce the thicknesses of the arms that need to have low stiffness while ensuring the minimum necessary stiffness to each of the arms, thereby resulting in a reduction in weight.

Patent Literature 6 discloses a crankshaft for a multicylinder engine, the crankshaft including a flywheel disposed at an end. In the crankshaft, an arm that is less distant from the flywheel has higher flexural rigidity and higher torsional rigidity than an arm that is more distant from the flywheel. Also, it is preferred that the arms are different from one another in the flexural rigidity and in the torsional rigidity. Accordingly, it is possible to attain a reduction in weight while suppressing flexural vibration and torsional vibration.

In such a case in which the arm shape and the weight shape of each arm are different from those of any other arm, what portion of the arm needs to have high stiffness differs from arm to arm, depending on the shape. Specifically, an arm may need to have high stiffness near the pin, and another arm may need to have high stiffness near the journal.

CITATION LIST

Patent Literature

Patent Literature 1: Japanese Patent Application Publication No. 2009-197929
Patent Literature 2: Japanese Patent Application Publication No. 2010-255834
Patent Literature 3: Japanese Patent Application Publication No. 2012-7726
Patent Literature 4: Japanese Patent Application Publication No. 2010-230027
Patent Literature 5: Japanese Patent Application Publication No. 2007-71227
Patent Literature 6: Japanese Patent Application Publication No. 2014-40856

SUMMARY OF INVENTION

Technical Problems

As disclosed in Patent Literatures 1 and 2, forming a recess in a pin-facing surface of an arm leads to a reduction in weight, but it also leads to a reduction in stiffness. Thus, in the light of ensuring of stiffness, there is a limit on weight reduction by forming of a recess, and it is difficult to comply with more demand for weight reduction.

As disclosed in Patent Literatures 3 and 4, making a hole in a surface of an arm allows for production of a forged crankshaft with a reduced weight and assured stiffness. In the production method, however, in making a hole, a surface of an arm is strongly punched and is deformed entirely, and a great force is necessary for the punching. Therefore, a special mechanism and a die for supplying a great force to a punch are required, and it is also necessary to give attention to the durability of a punch.

It is an object of the present invention to provide a method for producing a forged crankshaft with both a reduced weight and assured stiffness by a simple process.

Solution to Problems

A forged crankshaft production method according an embodiment of the present invention is a method for producing a forged crankshaft including journals serving as a center of rotation, pins decentered from the journals, crank arms connecting the journals and the pins, and counterweights integrated with some or all of the crank arms. The method comprises a die forging step of forming a forged blank having a crankshaft shape by die forging; and a pressing step of pressing the forged blank by a pair of first dies. The forged blank includes first excess portions attached to some or all of the crank arms each incorporating a counterweight, each of the first excess portions protruding from a side portion of the crank arm which the first excess portion is attached to, in a region near the journal adjacent to the crank arm. In the pressing step, the first excess portions are deformed by the first dies such that each of the first excess portions bulges toward the pin adjacent to the crank arm which the first excess portion is attached to.

The first dies preferably include inclined surfaces to face the first excess portions, and in the pressing step, the first excess portions are deformed preferably along the inclined surfaces.

The production method preferably further comprises a trimming step of removing flash from the forged blank. In this case, a forged blank with flash is formed in the die forging step, a forged blank with no flash is formed from the forged blank with flash in the trimming step, and the forged blank with no flash is pressed in the pressing step.

When the forged blank with flash is pressed in the pressing step, it is preferred that a pin-facing surface of each of the crank arms which the first excess portions are attached to, except at least the side portion in the region near the journal, is held by a second die abutted thereagainst.

When the second die is used, it is preferred that, in the pressing step, the second die is moved along with pressing performed by the first dies to be kept in a position to hold the crank arm.

In each of the crank arms on which the first excess portions are attached to, the first excess portions preferably protrude from both side portions of the crank arm, in the region near the journal.

It is preferred that the pressing step is performed during a coining step of correcting a shape of the crankshaft by pressing by use of a pair of dies.

The forged blank preferably includes second excess portions attached to some or all of the crank arms each incorporating a counterweight, each of the second excess portions protruding from a side portion of the crank arm which the second excess portion is attached to, in a region near the pin adjacent to the crank arm. In this case, in the pressing step, the second excess portions are deformed by the first dies such that each of the second excess portions bulges toward the journal adjacent to the crank arm which the second excess portion is attached to.

In each of the crank arms which the second excess portions are attached to, the second excess portions protrude from both side portions of the crank arm, in the region near the pin adjacent to the crank arm.

Advantageous Effects of Invention

In a forged crankshaft production method according to the present invention, in a die forging step, a forged blank is formed to include first excess portions attached to some or all of the crank arms each incorporating a counterweight, each of the first excess portions protruding from a side portion of the crank arm which the first excess portion is attached to, in a region near the journal adjacent to the crank arm. In a pressing step, the first excess portions are deformed such that each of the first excess portions bulges toward the pin adjacent to the crank arm which the first excess portion is attached to, whereby the side portion of the arm in a region near the journal adjacent to the crank arm is thickened. In this way, stiffness can be ensured efficiently as compared with a case of simply forming a recess, while a recess formed inside of the side portion allows for a reduction in weight. This production method does not require the use of a punch, and therefore, this production method can be carried out in a simple process without requiring any great force.

DESCRIPTION OF EMBODIMENTS

A forged crankshaft producing method according to an embodiment will hereinafter be described with reference to the drawings.

1. Shape of Crankshaft

A forged crankshaft that is the target of the present embodiment includes journals serving as a center of rotation, pins decentered from the journals, arms each connecting one of the journals and one of the pins adjacent thereto, and weights integrated with some or all of the arms respectively. Such a crankshaft is, for example, a forged crankshaft as shown by FIGS. 2A to 4B.

Figure 1A:
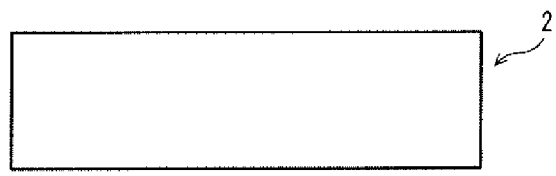
FIG. 1A is a schematic diagram of a billet during a conventional process of producing a forged crankshaft.
Figure 1B:
FIG. 1B is a schematic diagram of a rolled blank during the conventional process of producing a forged crankshaft.
Figure 1C:
FIG. 1C is a schematic diagram of a bent blank during the conventional process of producing a forged crankshaft.
Figure 1D:
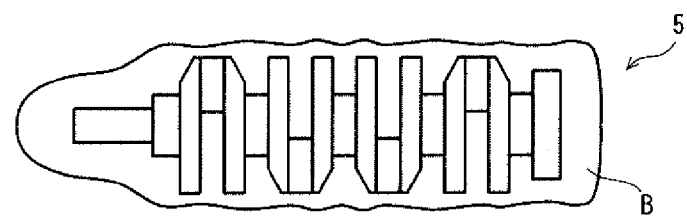
FIG. 1D is a schematic diagram of a rough forged blank during the conventional process of producing a forged crankshaft.
Figure 1E:
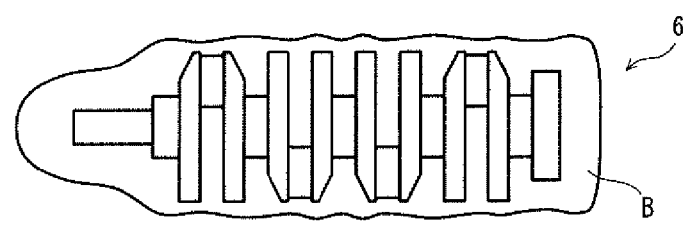
FIG. 1E is a schematic diagram of a finish forged blank during the conventional process of producing a forged crankshaft.
Figure 1F:
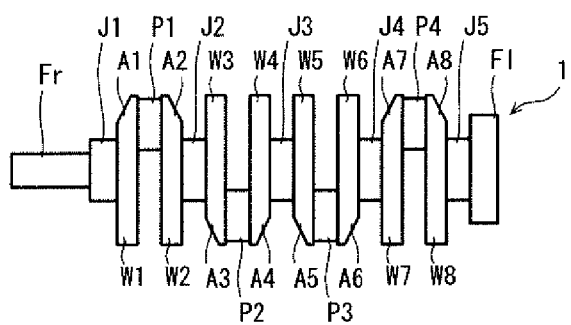
FIG. 1F is a schematic diagram of a crankshaft during the conventional process of producing a forged crankshaft.
Figure 2A:
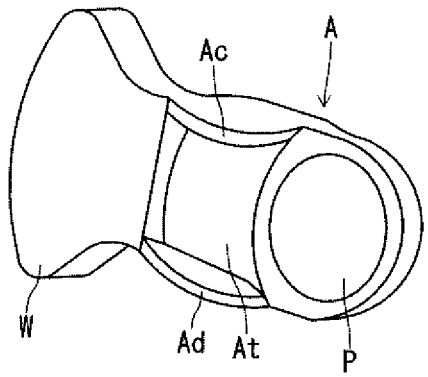
FIG. 2A is a perspective view schematically showing an example of the shape of a pin-facing surface of an arm of a crankshaft produced by a production method according to the present invention.
Figure 2B:
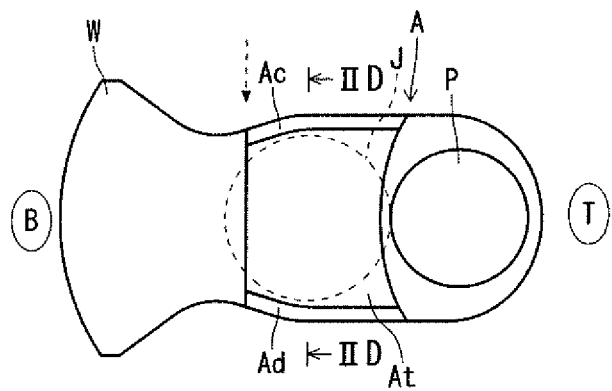
FIG. 2B is a view showing the pin-facing surface of the arm shown in FIG. 2B.
Figure 2C:
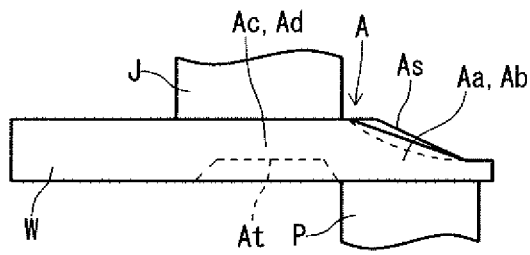
FIG. 2C is a view showing a side surface of the arm shown in FIG. 2A.
Figure 2D:
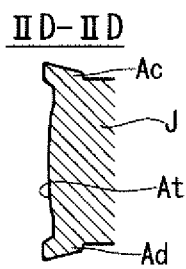
FIG. 2D is a sectional view of the arm along the line IID-IID in FIG. 2B.

FIGS. 2A to 2D are schematic diagrams showing an example of the shape of a pin-facing surface of an arm of a crankshaft produced by a production method according to the present invention. FIG. 2A is a perspective view, FIG. 2B is a view showing the pin-facing surface, FIG. 2C is a view showing a side surface, and FIG. 2D is a sectional view along the line IID-IID. FIGS. 2A to 2D show one of the arms of the crankshaft, the arm incorporating a weight. FIG. 2C is a projection drawing from the direction indicated by the dashed arrow in FIG. 2B. In the following description of the invention, with respect to the direction in which each of the pins is decentered, the side near the pin P will be referred to as a top side (see the reference symbol T in FIG. 2B), and the side near the weight W will be referred to as a bottom side (see the reference symbol B in FIG. 2B).

As shown in FIGS. 2A to 2D, the arm A incorporating a weight W has a recess in the pin P-facing surface, in an area At inside of both side portions Ac and Ad in the region near the journal J. The both side portions Ac and Ad in the region near the journal J bulge toward the pin P, and the thicknesses of the side portions Ac and Ad are greater than that of the recessed portion. The side portions mean the side surfaces of the arm A at both edges in the width direction of the arm A (direction perpendicular to the pin decentering direction) and the portions thereabout.

In the arm A, the side portions Ac and Ad in the region near the journal J are as thick as that of an arm with no thin portion, and yet, as a result, a recess is formed in the pin P-facing surface. A crankshaft with such arms A has a reduced weight because of the recesses formed in the respective pin P-facing surfaces of the arms A. Moreover, since the side portions Ac and Ad of each of the arms A in the region near the journal J are as thick as that of an arm with no thin portion, the crankshaft with such arms A has assured stiffness. In other words, since the side portions Ac and Ad of the arm A in the region near the journal J are thicker than the recessed portion, stiffness can be ensured.

The inventors studied stiffness, and they found that while the thickness of the inner area At has a small effect on the stiffness, the thicknesses of the side portions Ac and Ad around the edges in the width direction have a great effect on the stiffness.

Specifically, when a thin portion as described in Patent Literatures 1 and 2 is made in the pin-facing surface of an arm, the recessed thin portion extends in the width direction to both side surfaces. Accordingly, the side portions Ac and Ad around the edges in the width direction become thin, and the stiffness is lowered. In the crankshaft according to the present embodiment, however, the recessed portion of the pin P-facing surface is formed to lie only inside of the both side portions. The side portions Ac and Ad around the edges in the width direction are kept as thick as those of an arm with no thin portion, and a decrease in stiffness can be suppressed. Consequently, according to the present embodiment, the stiffness of the crankshaft can be ensured efficiently as compared with a case in which a thin portion is simply formed, and an enlargement of the recessed portion disposed inside of the side portions Ac and Ad leads to a further reduction in weight.

For efficient ensuring of stiffness, it is preferred that the thick portions in the side portions Ac and Ad in the region near the journal J include an area extending from the outer edge of a pin-thrust portion (not shown in the drawings) on the bottom side to the center of the journal. Here, the pin-thrust portion means a portion that is disposed on the pin-facing surface of the arm to limit motion of a connecting rod in a thrust direction.

The shape of the inner area At inside of the side portions Ac and Ad in the region near the journal J (the shape of the bottom surface of the recessed portion) is preferably convex such that the center in the width direction bulges as shown in FIG. 2D. In other words, it is preferred that the thickness of the inner area At decreases gradually as becoming more distant from the center in the width direction. Since the shape of the bottom surface of the recessed portion is convex such that the center in the width direction bulges, the stiffness and especially the flexural rigidity can be improved.

Next, a preferred example of the shape of the journal-facing surface of the arm A incorporating a weight is described.

Figure 3A:
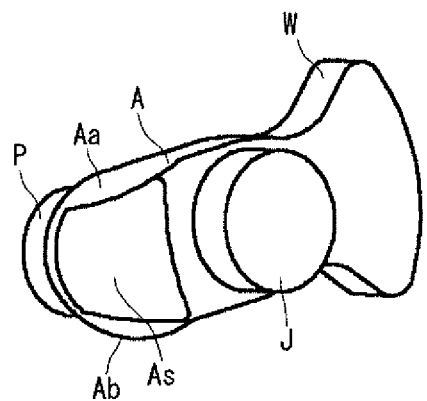
FIG. 3A is a perspective view schematically showing an example of the shape of a journal-facing surface of a preferred arm of a crankshaft produced by the production method according to the present invention.
Figure 3B:
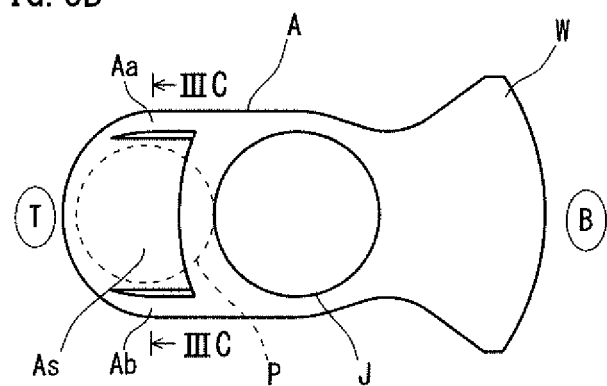
FIG. 3B is a view showing the journal-facing surface of the arm shown in FIG. 3A.
Figure 3C:
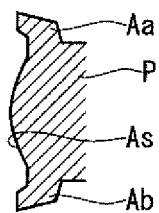
FIG. 3C is a sectional view of the arm along the line IIIC-IIIC in FIG. 3B.

FIGS. 3A to 3C are schematic diagrams showing an example of the shape of the journal-facing surface of a preferred arm of the crankshaft produced by the production method according to the present invention. FIG. 3A is a perspective view, FIG. 3B is a view showing the journal-facing surface of the arm, and FIG. 3C is a sectional view along the line IIIC-IIIC.

As shown in FIGS. 3A to 3C, the arm A incorporating a weight W preferably has a recess in the journal J-facing surface, in an area As inside of both side portions Aa and Ab in the region near the pin P. The both side portions Aa and Ab in the region near the pin P preferably bulge toward the journal J, and the thicknesses of the side portions Aa and Ab are preferably greater than that of the recessed portion.

In the arm A, the side portions Aa and Ab in the region near the pin P are as thick as those of an arm with no thin portion, and yet, as a result, a recess is formed in the journal J-facing surface. Since the side portions Aa and Ab in the region near the pin P are as thick as those of an arm with no thin portion, stiffness can be ensured. In other words, since the side portions Aa and Ab in the region near the pin P are thicker than the inner area As, stiffness can be ensured. Also, forming a recess in the journal J-facing surface of the arm A leads to a further reduction in weight.

The shape of the inner area As inside of the side portions Aa and Ab in the region near the pin P (the shape of the bottom surface of the recessed portion) is preferably convex such that the center in the width direction bulges as shown in FIG. 3C. In other words, it is preferred that the thickness of the inner area As decreases gradually as becoming more distant from the center in the width direction. Since the shape of the bottom surface of the recessed portion is convex such that the center in the width direction bulges, the stiffness and especially the flexural rigidity can be improved.

Next, a preferred example of an arm with no weight, that is, a non-weight arm is described.

Figure 4A:
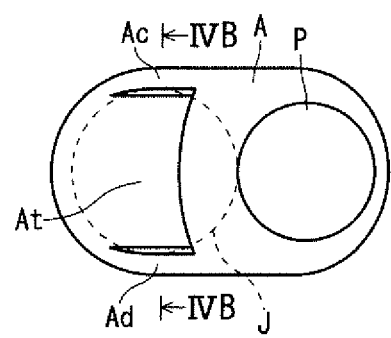
FIG. 4A is a perspective view schematically showing an example of the shape of a pin-facing surface of a preferred non-weight arm of a crankshaft produced by the production method according to the present invention.
Figure 4B:
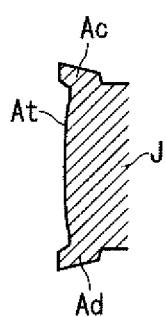
FIG. 4B is a sectional view of the non-weight arm along the line IVB-IVB in FIG. 4A.

FIGS. 4A and 4B are schematic diagrams showing an example of the shape of a preferred non-weight arm of a crankshaft produced by the production method according to the present invention. FIG. 4A is a perspective view showing a pin-facing surface, and FIG. 4B is a sectional view along the line IVB-IVB. FIGS. 4A to 4B show one of the non-weight arms of the crankshaft.

As shown in FIGS. 4A and 4B, the non-weight arm A preferably has a recess in the pin P-facing surface, in an area At inside of both side portions Ac and Ad in the region near the journal J, as with the case of the arm incorporating a weight shown in FIGS. 2A to 2D. The both side portions Ac and Ad in the region near the journal J preferably bulge toward the pin P, and the thicknesses of the side portions Ac and Ad are preferably greater than that of the recessed portion. In this case, since the side portions Ac and Ad in the region near the journal J are as thick as those of an arm with no thin portion, the stiffness is ensured. In other words, since the side portions Ac and Ad in the region near the journal J are thicker than the recessed portion, stiffness can be ensured. Also, forming a recess in the pin P-facing surface of the arm A leads to a further reduction in weight.

As with the case of the arm incorporating a weight, in the non-weight arm A also, the shape of the inner area At inside of the side portions Ac and Ad in the region near the journal J (the shape of the bottom surface of the recessed portion) is preferably convex such that the center in the width direction bulges as shown in FIG. 4B. Since the shape of the bottom surface of the recessed portion is convex such that the center in the width direction bulges, the stiffness and especially the flexural rigidity can be improved.

Moreover, as with the case of the arm incorporating a weight shown in FIGS. 3A to 3C, the non-weight arm A preferably has a recess in the journal J-facing surface, in an area As inside of both side portions Aa and Ab in the region near the pin P, though it is not shown in the drawings. The both side portions Aa and Ab in the region near the pin P preferably bulge toward the journal J, and the thicknesses of the side portions Aa and Ab are preferably greater than that of the recessed portion. In this case, since the side portions Aa and Ab in the region near the pin P are as thick as those of an arm with no thin portion, stiffness is ensured. In other words, since the side portions Aa and Ab in the region near the pin P are thicker than the inner area As, stiffness can be endured. Also, forming a recess in the journal J-facing surface of the arm A leads to a further reduction in weight.

As with the case of the arm incorporating a weight shown in FIG. 3C, in the non-weight arm A also, the shape of the inner area As inside of the side portions Aa and Ab in the region near the pin P (the shape of the bottom surface of the recessed portion) is preferably convex such that the center in the width direction bulges. Since the shape of the bottom surface of the recessed portion is convex such that the center in the width direction bulges, the stiffness and especially the flexural rigidity can be improved.

In the forged crankshaft production method according to the embodiment, in a pressing step of pressing a forged blank, the side portions of an arm incorporating a weight in the region near the journal are thickened. In the pressing step, further, the side portions of the arm incorporating a weight in the region near the pin may be thickened. In the pressing step, furthermore, either or both of the side portions of a non-weight arm in the region near the pin and either of both of the side portions thereof in the region near the journal may be thickened. The shapes of the arms of the crankshaft before undergoing the pressing step will be described sequentially regarding an arm incorporating a weight and regarding a non-weight arm.

Figure 5A:
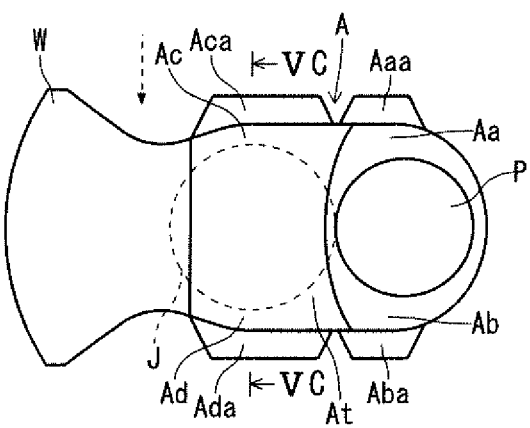
FIG. 5A is a schematic view showing an example of the shape of a pin-facing surface of an arm incorporating a weight before undergoing a pressing step.
Figure 5B:
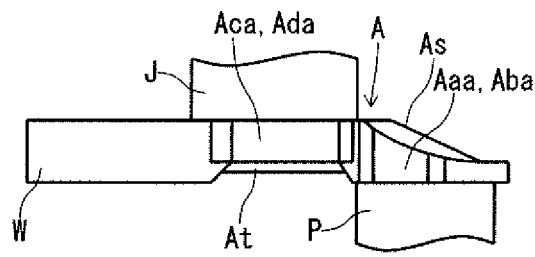
FIG. 5B is a view of a side surface of the arm shown in FIG. 5A.
Figure 5C:
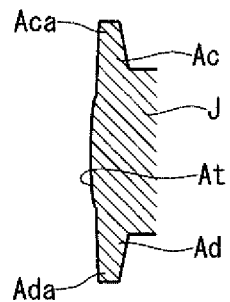
FIG. 5C is a sectional view of the arm along the line VC-VC in FIG. 5A.

FIGS. 5A to 5C are schematic diagrams showing an example of the shape of a pin-facing surface of an arm incorporating a weight before undergoing the pressing step. FIG. 5A is a view showing the pin-facing surface, FIG. 5B is a view showing a side surface, and FIG. 5C is a sectional view along the line VC-VC. FIGS. 5A to 5C show one of the arms of the crankshaft incorporating a weight. FIG. 5B is a projection drawing from the direction indicated by the dashed arrow in FIG. 5A.

As shown in FIGS. 5A to 5C, regarding the arm A incorporating a weight W, before undergoing the pressing step, the inner area At of the pin P-facing surface inside of the side portions Ac and Ad in the region near the journal J has a surface shape in agreement with the bottom surface shape of the recess after undergoing the pressing step. The surface shape extends smoothly to the side portions Ac and Ad in the region near the journal J. Accordingly, the thicknesses of the side portions Ac and Ad in the region near the journal J in the moment are smaller than those after undergoing the pressing step.

The arm A incorporating a weight W also has first excess portions Aca and Ada on the outer periphery of the side portion Ac and on the outer periphery of the side portion Ad, respectively, in the region near the journal J. The first excess portions Aca and Ada protrude in the width direction from the outer periphery of the side portion Ac and from the outer periphery of the side portion Ad, respectively, in the region near the journal J. The first excess portions Aca and Ada shown in FIGS. 5A to 5c are plate-shaped, and are disposed along the outer periphery of the side portion Ac and the outer periphery of the side portion Ad, respectively, in the region near the journal J. The thicknesses of the first excess portions Aca and Ada are comparable to or less than the thicknesses of the side portions Ac and Ad, which are the bases of the excess portions Aca and Ada.

Figure 6A:
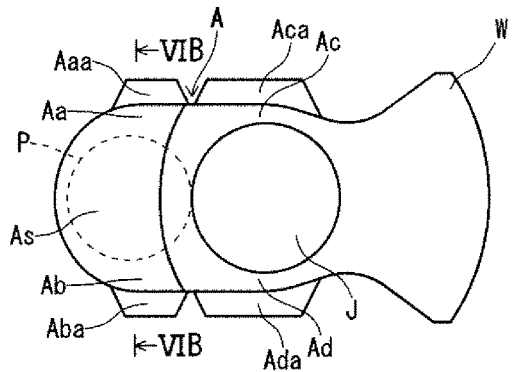
FIG. 6A is a schematic view showing an example of the shape of a journal-facing surface of an arm incorporating a weight before undergoing the pressing step.
Figure 6B:
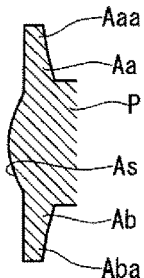
FIG. 6B is a sectional view of the arm along the line VIB-VIB in FIG. 6A.

FIGS. 6A and 6B are schematic diagrams showing an example of the shape of a journal-facing surface of the arm incorporating a weight before undergoing the pressing step. FIG. 6A is a view showing the journal-facing surface, and FIG. 6B is a sectional view along the line VIB-VIB.

As described above, the arm A incorporating a weight W preferably has thick side portions Aa and Ab in the region near the pin P and has a recess in the journal J-facing surface.

In this case, regarding the arm A incorporating a weight W, before undergoing the pressing step, the inner area of the journal J-facing surface inside of the side portions Aa and Ab in the region near the pin P has a surface shape in agreement with the bottom surface shape of the recess after undergoing the pressing step (the recess of the final product). The surface shape extends smoothly to the side portions Aa and Ab in the region near the pin P. Accordingly, thicknesses of the side portions Aa and Ab in the region near the pin P in the moment are smaller than those after the pressing step.

The arm incorporating a weight further has second excess portions Aaa and Aba formed on the outer periphery of the side portion Aa and on the outer periphery of the side portion Ab, respectively, in the region near the pin P. The second excess portions Aaa and Aba are plate-shaped, and are disposed along the outer periphery of the side portion Aa and the outer periphery of the side portion Ab, respectively, in the region near the journal J. The thicknesses of the second excess portions Aaa and Aba are comparable to or less than the thicknesses of the side portions Aa and Ab, which are the bases of the excess portions Aaa and Aba.

Figure 7A:
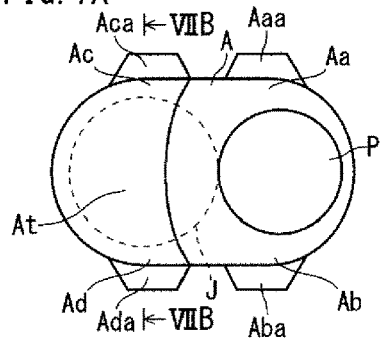
FIG. 7A is a schematic view showing an example of the shape of a pin-facing surface of a non-weight arm before undergoing the pressing step.
Figure 7B:
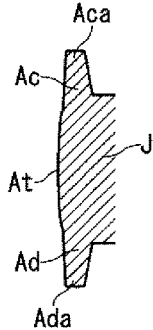
FIG. 7B is a sectional view of the arm along the line VIIB-VIIB in FIG. 7A.

FIGS. 7A and 7B are schematic diagrams showing an example of the shape of a pin-facing surface of a non-weight arm before undergoing the pressing step. FIG. 7A is a view showing the pin-facing surface, and FIG. 7B is a sectional view along the line VIIB-VIIB.

As described above, a non-weight arm A preferably has thick side portions Ac and Ad in the region near the journal J and has a recess in the pin P-facing surface. In this case, as with the case of the arm A incorporating a weight W shown in FIGS. 5A to 5C, the inner area At of the pin P-facing surface inside of the side portions Ac and Ad in the region near the journal J has a surface shape in agreement with the bottom surface shape of the recess after undergoing the pressing step. The non-weight arm A has first excess portions Aca and Ada on the outer periphery of the side portion Ac and on the outer periphery of the side portion Ad, respectively, in the region near the journal J, and the first excess portions Aca and Ada protrude in the width direction from the outer periphery of the side portion Ac and from the outer periphery of the side portion Ad, respectively, in the region near the journal J.

As described above, the non-weight arm A preferably has thick side portions Aa and Ab in the region near the pin P and has a recess in the journal J-facing surface. In this case, as with the case of the arm A incorporating a weight W, the inner area of the journal J-facing surface inside of the side portions in the region near the pin P has a surface shape in agreement with the bottom surface shape of the recess after undergoing the pressing step (the recess of the final product), though it is not shown in the drawings. The non-weight arm A further has second excess portions Aaa and Aba on the outer periphery of the side portion Aa and on the outer periphery of the side portion Ab, respectively, in the region near the pin P, and the second excess portions Aa and Ab protrude in the width direction from the outer periphery of the side portion Aa and from the outer periphery of the side portion Ab, respectively, in the region near the pin P.

2. Forged Crankshaft Production Method

A forged crankshaft production method according to an embodiment comprises a die forging step, and a pressing step, which are to be performed in this order. As in a first example of process described below, a trimming step may be added between the die forging step and the pressing step. Alternatively, as in a second example of process described below, the trimming step may be added as a step after the pressing step. Otherwise, as in a third example of process described below, it is possible to carry out the trimming step during the pressing step.

As a preliminary step to the die forging step, for example, a preforming step may be added. In the case where the trimming step is added between the die forging step and the pressing step, for example, a coining step may be added as a step after the pressing step. Alternatively, the pressing step may be performed during the coining step. When adjustment of the placement angles of the pins is necessary, a twisting step is added between the trimming step and the coining step. These steps are hot working and carried out sequentially.

[First Example of Process]

An example of process in which the trimming step is carried out between the die forging step and the pressing step is described.

For example, the preforming step includes a rolling step and a bending step. In the rolling step and in the bending step, the volume of a billet (starting material) is distributed, whereby a bent blank is formed.

In the die forging step, a forged blank with flash formed into a crankshaft shape is obtained. For example, as with the forged blank with no flash shown in FIGS. 5A to 5C, the forged blank includes journals J, pins P and arms A. In the forged blank, an arm A incorporating a weight W has first excess portions Aca and Ada protruding from the outer periphery of the side portion Ac and the outer periphery of the side portion Ad, respectively, in the region near the journal J. In the forged blank, the arm A incorporating a weight W may further have second excess portions Aaa and Aba protruding from the outer periphery of the side portion Aa and the outer periphery of the side portion Ab, respectively, in the region near the pin P.

The die forging step to obtain such a forged blank may include a rough forging step and a finish forging step, which are to be carried out in this order.

In the die forging step, the draft of the die never becomes a reverse draft either at a portion corresponding to the inner area At of the pin P-facing surface inside of the side portions or at a portion corresponding to the first excess portions Aca and Ada. Therefore, both the rough forging step and the finish forging step can be carried out with no trouble, and a forged blank can be obtained.

Also in the case shown by FIGS. 3A to 3C or FIGS. 6A and 6B in which an arm A incorporating a weight W has thick side portions Aa and Ab in the region near the pin P and has a recess in the journal J-facing surface, the draft of the die never becomes a reverse draft for the same reason. Also in the case in which a non-weight arm A has thick side portions Ac and Ad in the region near the journal J and has a recess in the pin P-facing surface, the draft of the die never becomes a reverse draft. Further, in the case in which the non-weight arm A has thick side portions Aa and Ab in the region near the pin P and has a recess in the journal J-facing surface, the draft of the die never becomes a reverse draft. In these cases, both the rough forging step and the finish forging step can be carried out with no trouble.

In the trimming step, while the forged blank with flash is held in a pair of dies, the flash is punched out, whereby the flash is removed from the forged blank. In this way, a forged blank with no flash can be obtained.

In the pressing step, the forged blank with no flash is pressed by a first pair of dies. In this step, the first excess portions are pressed and deformed by the first pair of dies to be caused to bulge toward the pin. Thereby, the side portions of the arm in the region near the journal are thickened. When the forged blank with flash has second excess portions, the second excess portions are caused to bulge toward the journal in the pressing step. Thereby, the side portions of the arm in the region near the pin are thickened. The process flow of the pressing step will be described later.

In the coining step, the forged blank with no flash is pressed by a pair of dies to have correct dimensions of the final product. As mentioned above, the pressing step can be carried out during the coining step. It is preferred that the pressing step is carried out during the coining step because a conventional production process can be adopted in this case.

When adjustment of the placement angles of the pins is necessary, the placement angles of the pins are adjusted in a twisting step after the trimming step (before the coining step). In the forged crankshaft production method according to the present embodiment, a forged crankshaft is obtained through the above-described process.

[Second Example of Process]

An example of process in which the trimming step is carried out after the pressing step is described.

Before the die forging step, the preforming step as described in connection with the first example of process may be carried out. In the die forging step, a forged blank with flash formed into a crankshaft shape is obtained. As with the case of the first example of process, the forged blank has first excess portions. The forged blank may further have second excess portions. The die forging step to obtain such a forged blank corresponds to a rough forging step in a conventional production process.

In the pressing step, the forged blank with flash is pressed by a pair of dies. In this step, the first excess portions are pressed and deformed by the first pair of dies to be caused to bulge toward the pin. When the forged blank has second excess portions, the second excess portions are caused to bulge toward the journal in the pressing step. Additionally, during the pressing by the first pair of dies, the forged blank with flash is formed into a shape in agreement with the shape of the final product. The pressing step in this process corresponds to a finish forging step in a conventional production process.

In the subsequent trimming step, the flash is removed from the forged blank after undergoing the pressing step in the same way as that in the first example of process, whereby a forged blank with no flash is obtained. If needed, the coining step may be carried out after the trimming step. When adjustment of the placement angles of the pins is necessary, the placement angles of the pins are adjusted in a twisting step after the trimming step.

[Third Example of Process]

An example of process in which the pressing step is carried out during the trimming step is described.

Before the die forging step, the preforming step as described in connection with the first example of process may be carried out. In the die forging step, as with the case of the first example of process, a forged blank with flash formed into a crankshaft shape is obtained. The die forging step may include a rough forging step and a finish forging step, which are to be carried out in this order. As with the case of the first example of process, the forged blank has first excess portions. The forged blank may further have second excess portions.

When the pressing step is carried out during the trimming step, the forged blank with flash is held in a first pair of dies. Then, the forged blank with flash is pressed, and the first excess portions are deformed to bulge toward the pin. When the forged blank has second excess portions, also, the second excess portions are caused to bulge toward the journal. Subsequently, while the forged blank is held in the first pair of dies, the flash is punched out with a cutting die, whereby the flash is removed from the forged blank. If needed, the coining step may be carried out after the trimming step. When adjustment of the placement angles of the pins is necessary, the placement angles of the pins are adjusted in a twisting step after the trimming step.

3. Process Flow of Pressing Step

In the pressing step, as described above, the excess portions are pressed with the first pair of dies, whereby the side portions of each of the arms are thickened. The way of deforming the excess portions is bending or crushing.

[First Example of Process Flow]

First, an example of process flow (first example of process flow) to bend the excess portions in the pressing step is described. The first example of process flow is a process flow of the pressing step in the first example of process.

Figure 8A:
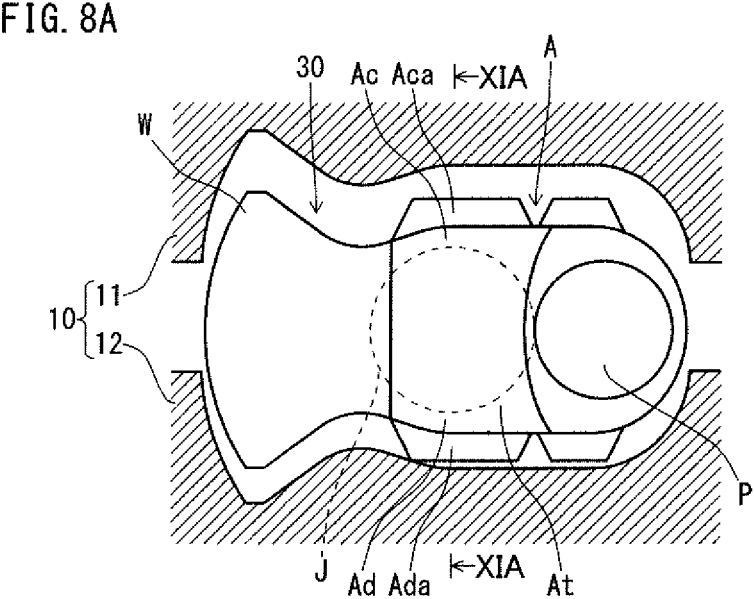
FIG. 8A is a schematic diagram showing a pin-facing surface of an arm incorporating a weight at a time when a second die is abutted on the arm in an example of process flow of the pressing step (first example of process flow) to bend first excess portions.

FIGS. 8A to 12B are schematic diagrams of an arm incorporating a weight, showing an example of process flow to bend the first excess portions in the pressing step. FIGS. 8A and 8B show the pin-facing surface of the arm. FIG. 8A shows a time when a second die is abutted on the arm, and FIG. 8B shows a time when the pressing has been finished. FIGS. 9A and 9B show the pin-facing surface of the arm. FIG. 9A shows the time when the second die is abutted on the arm, and FIG. 9B shows the time when the pressing has been finished. FIGS. 8A to 9B show a forged blank with no flash 30 and the first pair of dies 10 composed of an upper die and a lower die, and omit to show the second die, a third die and a jig, which will be described later, in order to facilitate understanding of the drawings.

Figure 8B:
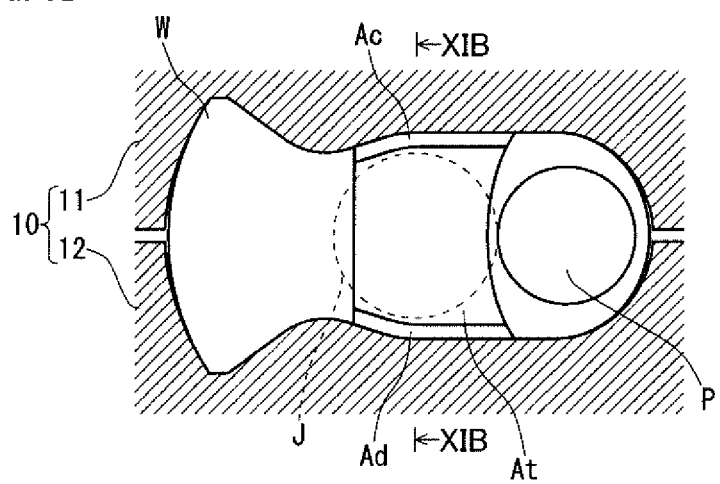
FIG. 8B is a schematic diagram showing the pin-facing surface of the arm at a time when the pressing has been finished along with the first process flow.
Figure 10A:
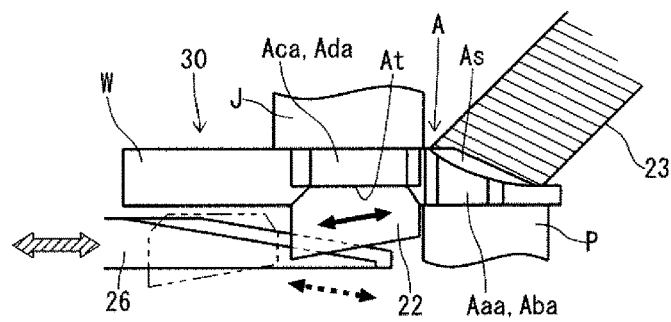
FIG. 10A is a schematic diagram showing a side surface of the arm at the time when the second die is abutted on the arm in the first example of process flow.
Figure 10B:
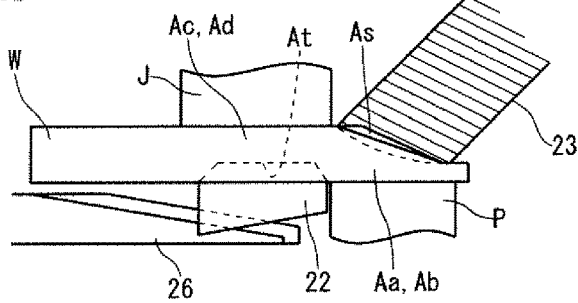
FIG. 10B is a schematic diagram showing the side surface of the arm at the time when the pressing has been finished along with the first process flow.

FIGS. 10A and 10B show a side surface of the arm. FIG. 10A shows the time when the second die is abutted on the arm, and FIG. 8B shows the time when the pressing has been finished. FIGS. 10A and 10B show the forged blank with no flash 30, the second die 22 abutting the arm, the third die 23 and the jig 26, and omit to show the first pair of dies in order to facilitate understanding of the drawings. In FIG. 10A, the second die 22 in a retreating position is indicated by an alternate long and two short dashes line.

Figure 11A:
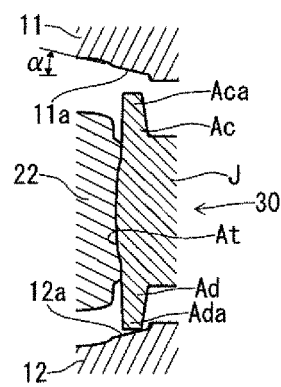
FIG. 11A is a sectional view of the arm in a region near the journal (along the line XIA-XIA in FIG. 8A) at the time when the second die is abutted on the arm in the first example of process flow.
Figure 11B:
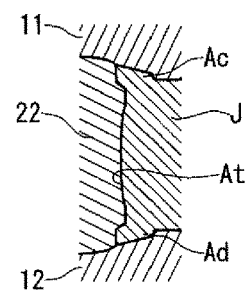
FIG. 11B is a sectional view of the arm in the region near the journal (along the line XIA-XIA in FIG. 8A) at the time when the pressing has been finished along with the first process flow.

FIGS. 11A and 11B are sectional views of the arm in the region near the journal. FIG. 11A is a sectional view along the line XIA-XIA (see FIG. 8A) at the time when the second die is abutted on the arm, and FIG. 11B is a sectional view along the line XIB-XIB (see FIG. 8B) at the time when the pressing step has been finished. FIGS. 11A and 11B show the forged blank with no flash 30 and the first pair of dies 11 and 12, and the second die 22.

Figure 12A:
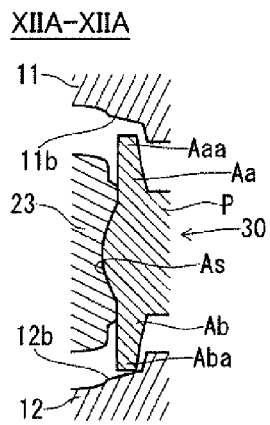
FIG. 12A is a sectional view of the arm in a region near the pin (along the line XIIA-XIIA in FIG. 9A) at the time when the second die is abutted on the arm in the first example of process flow.
Figure 12B:
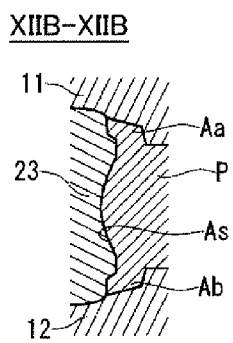
FIG. 12B is a sectional view of the arm in the region near the pin (along the line XIIA-XIIA in FIG. 9A) at the time when the pressing has been finished along with the first process flow.

FIGS. 12A and 12B are sectional views of the arm in the region near the pin. FIG. 12A is a sectional view along the line XIIA-XIIA (see FIG. 9A) at the time when the second die is abutted on the arm, and FIG. 12B is a sectional view along the line XIIB-XIIB (see FIG. 9B) at the time when the pressing step has been finished. FIGS. 12A and 12B show the forged blank with no flash 30, the first pair of dies 11 and 12, and the third die 23.

In the pressing step, the first pair of dies 10 is used. The first pair of dies 10 is composed of an upper die 11 and a lower die 12, and the upper die and the lower die 12 each have an impression. The impressions reflect the final shape of the crankshaft. Specifically, the impressions reflect the shapes of the side portions of an arm incorporating a weight in the region near the journal so as to bend the first excess portions Aca and Ada. The portions of the impressions contributing to the bending of the first excess portions include inclined surfaces 11a and 12a. The inclined surfaces 11a and 12a have such inclinations as to push the first excess portions toward the pin-facing surface (see FIG. 11A).

When the arm incorporating a weight further has second excess portions Aaa and Aba, the impressions of the dies reflect the shapes of the side portions of the arm in the region near the pin so as to bend the second excess portions. The portions of the impressions contributing to the bending of the second excess portions include inclined surfaces 11b and 12b. The inclined surfaces 11b and 12b have such inclinations as to push the second excess portions toward the journal-facing surface (see FIG. 12A).

When a non-weight arm has first excess portions Aca and Ada, the impressions reflect the shapes of the side portions of the non-weight arm in the region near the journal so as to bend the first excess portions, though it is not shown in the drawings. The portions of the impressions contributing to the bending of the first excess portions include inclined surfaces to face the first excess portions. The inclined surfaces have such inclinations as to push the first excess portions toward the pin-facing surface.

When the non-weight arm further has second excess portions Aaa and Aba, the impressions reflect the shapes of the side portions of the non-weight arm in the region near the pin so as to bend the second excess portions, though it is not shown in the drawings. The portions of the impressions contributing to the bending of the second excess portions include inclined surfaces to face the second excess portions. The inclined surfaces have such inclinations as to push the second excess portions toward the journal-facing surface.

When the pressing step is carried out during the coining step, the impressions of the dies reflect not only the shapes of the side portions of each of the arms but also the shapes of the other portions of each of the arms. Further, the impressions of the dies reflect the shapes of the journals and the shapes of the pins.

As shown in FIGS. 11A and 11B, only with the first dies 11 and 12, the portion of the pin P-facing surface of the arm A corresponding to the inner area At inside of the side portions is open. The second die 22 may be put in the open space. The second die 22 has an impression that reflects the shape of the recess to be formed in the pin-P facing surface of the arm A. The second die 22 is movable back and forth independently of the first pair of dies 10 to come into contact with and separate from the inner area At of the surface of the arm.

In this regard, the second die 22 is located between two adjacent arms, and the space for the second die 22 is very small. Therefore, as shown in FIGS. 10A and 10B, the second die 22 may be configured to be connected to a jig 26 movable in the decentering direction of the pins. The connection mechanism is described below.

In order to allow the second die 22 to move back and forth, the second die 22 is supported by a guide member (not shown) to be movable in a guiding direction (see the solid arrow in FIG. 10A). The second die 22 is also connected to the jig 26 to be slidable in a sliding direction (see the dashed arrow in FIG. 10A). The jig 26 is connected to a hydraulic cylinder or the like, and the jig 26 is movable in the decentering direction (see the hatched arrow in FIG. 10A) along with the motion of the hydraulic cylinder.

When the jig 26 and the second die 22 are connected in this manner, along with the motion of the jig 26 in the pin decentering direction, the second die 22 moves in the guiding direction (see the solid arrow) within the range from the abutting position to the retreating position. In this regard, the second die 22 moves relative to the jig 26 in the sliding direction (see the dashed arrow).

The second die 22 may be movable not only back and forth as described above but also in the pressing direction by the first pair of dies 10. The motion of the second die 22 in the pressing direction can be realized by means of a spring, a hydraulic cylinder or the like. The means for the motion in the pressing direction is separate from the drive source for the back-and-forth motion of the second die 22.

When the arm incorporating a weight has second excess portions, as shown in FIGS. 12A and 12B, only with the first dies 10, the portion of the journal J-facing surface of the arm A corresponding to the inner area As inside of the side portions is open. The third die 23 may be put in the open space. The third die 23 has an impression that reflects the shape of the recess to be formed in the journal J-facing surface of the arm A. The third die 23 is movable back and forth, and the back-and-forth motion of the third die 23 is achieved by motion of a hydraulic cylinder or the like connected thereto. As with the second die, the third die 23 may be movable in the pressing direction by the first pair of dies 10.

When a non-weight arm has first excess portions, only with the first dies 11 and 12, the portion of the pin P-facing surface of the arm A corresponding to the inner area At inside of the side portions is open, though it is not shown in the drawings. A fourth die that is the same as the second die 22 may be put in the open space. Also, when the non-weight arm has second excess portions, only with the first dies 11 and 12, the portion of the journal J-facing surface of the arm A corresponding to the inner area As inside of the side portions is open. A fifth die that is the same as the third die 23 may be put in the open space.

An example of process flow of the pressing step in the production method according to the present embodiment using the first pair of dies 10 is described. First, the upper die 11 and the lower die 12 of the first pair of dies 10 are separated from each other, and the forged blank with no flash 30 that is obtained after the trimming step is placed between the upper die 11 and the lower die 12. When the second to the fifth dies are used, the second to the fifth dies are placed in their respective retreating positions before the forged blank with no flash 30 is placed.

When the second to the fifth dies are used, as shown in FIGS. 10A, 11A and 12A, the second to the fifth dies are moved forward and abutted on the respective surfaces of the arms A. Thereby, the surfaces of the arms A are supported. However, the side portions in the region near the journal to which the first excess portions Aca and Ada are attached and the side portions in the region near the pin to which the second excess portions Aaa and Aba are attached are not abutted by any of the second to the fifth dies (see FIGS. 11A and 12A). The reason is that abutting any die on these portions to hold these portions will cause a failure to thicken the side portions in the region near the journal and the side portions in the region near the pin.

In the state, the upper die 11 and the lower die 12 of the first pair of dies 10 are moved closer to each other, and more specifically, the upper die 11 is moved down to the bottom dead point. Thereby, the forged blank with no flash 30 is pressed by the first pair of dies 10. In the pressing, as shown in FIG. 11B, the first excess portions Aca and Ada are bent toward the pin P-facing surface of the arm A along the inclined surfaces of the impressions of the first pair of dies 10, and thus, the first excess portions Aca and Ada are caused to bulge toward the pin P. Consequently, the side portions Ac and Ad of the arm in the region near the journal J are thickened. Accordingly, the produced crankshaft has an arm having thick side portions Ac and Ad in the region near the journal J.

When the arm incorporating a weight has second excess portions, in the pressing, the second excess portions Aaa and Aba are bent toward the journal J-facing surface of the arm A by the first pair of dies 10 in a similar manner. This causes the second excess portions Aaa and Aba to bulge toward the journal J, and consequently, the side portions Aa and Ab in the region near the pin P are thickened.

When a non-weight arm has first excess portions, in the pressing, the first excess portions are bent toward the pin Placing surface of the arm A by the first pair of dies 10. This causes the first excess portions to bulge toward the pin P, and consequently, the side portions of the arm in the region near the journal J are thickened. When the non-weight arm has second excess portions, in the pressing, the second excess portions are bent toward the journal J-facing surface of the arm A by the first pair of dies 10. This causes the second excess portions to bulge toward the journal J, and consequently, the side portions of the arm in the region near the pin P are thickened.

When the pressing step is carried out during the coining step, the shape of the crankshaft is further corrected in the pressing, and the crankshaft is formed into the final shape.

Thereafter, the upper die 11 and the second die 12 of the first pair of dies 10 are separated from each other, and more specifically, the upper die 11 is moved up to the top dead point. When the second to the fifth dies are used, the second to the fifth dies are moved to the respective retreating positions before the upper die 11 and the second die 12 are separated from each other. In the state in which the upper die 11 and the second die 12 are separated from each other, the forged blank with no flash 30 after undergoing the process is taken out.

In the forged crankshaft production process according to the present embodiment, it is possible to form a recess in the pin P-facing surface of an arm A incorporating a weight while thickening the side portions Ac and Ad in the region near the journal J. Accordingly, the forged crankshaft production process according to the present embodiment allows for the production of a forged crankshaft having both a reduced weight and assured stiffness.

In the forged crankshaft production method according to the present embodiment, the first excess portions Aca and Ada are bent by the first pair of dies 10. Alternatively, the first excess portions Aca and Ada are crashed by the first pair of dies 10 as will be described later. Thereby, the side portions Aca and Ada in the region near the journal are thickened. Thus, the forged crankshaft production method according to the present embodiment does not require great force for implementation thereof.

In the arm A shown in FIGS. 2A to 2D, the range where the recess is formed in the pin P-facing surface is the same as the range where the thick side portions Ac and Ad in the region near the journal J extend. Here, the range means the range in the decentering direction of the pins. The range where the recess is formed in the pin P-facing surface may be different from the range where the thick side portions Ac and Ad in the region near the journal J extend. In order to perform the bending without fail, it is preferred that the recess is formed in the pin P-facing surface, in a range corresponding to the range where the thick side portions Ac and Ad in the region near the journal J extend.

When the first pair of dies 10 have inclined surfaces which are to come into contact with the excess portions Aaa, Aba, Aca and Ada, the inclination angles α of the inclined surfaces (see FIG. 11A) are preferably 3 to 20°. The inclination angle means the angle between the parting plane and the inclined surface. Setting the inclination angles α not less than 3° facilitates the bending and reduces the risk of causing deformation of the recess during the bending. Also, setting the inclination angles α of not more than 20° facilitates thickening of the side portions of the arm by the bending. This ensures an increase in stiffness and a reduction in weight.

In order to facilitate the bending, it is preferred that the excess portions of the arm before undergoing the pressing step have respective original points for deformation, that is, for bending.

Figure 13A:
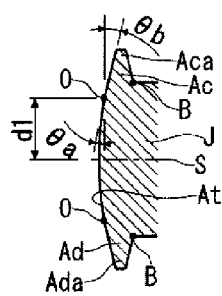
FIG. 13A is a sectional view of an arm having no steps at original points for bending of excess portions.
Figure 13B:
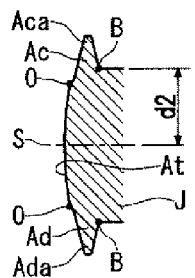
FIG. 13B is a sectional view of an arm having steps at original points for bending of excess portions.

FIGS. 13A and 13B are sectional views showing the original points for bending. FIG. 13A shows an arm having no steps at the original points, and FIG. 13B shows an arm having steps at the original points. FIGS. 13A and 13B are sectional views along lines corresponding to the line VC-VC in FIG. 5A. FIGS. 13A and 13B show the sectional shapes of the arms A in the region near the journal J before undergoing the pressing step. The arms A shown in FIGS. 13A and 13B each have, in the inner area Ad inside of the side portions Ac and Ad in the region near the journal J, a surface shape in agreement with the bottom surface shape of the recess after undergoing the pressing step. In the inner area At, the inclination C) becomes greater continuously with increasing distance from an arm center plane (see the reference symbol S in FIG. 13A). The surface shape extends to the both side portions Ac and Ad in the region near the journal J. In the side portions Ac and Ad, the inclination C) is constant.

The inclination (unit: °, see θa and θb) is the angle between the surface of the arm and a plane perpendicular to the axis of the journal. The arm center plane means a plane including the axis of the journal and the axis of the pin.

The arm A shown in FIG. 13A has original points O on the pin P-facing surface. On the original points, the relationship between the distance from the arm center plane and the inclination is discontinued. When the arm A has such original points O, the first excess portions Aca and Ada are easily bent at the original points O, that is, the original points O facilitate the bending, which reduces the risk of causing deformation of the recess during the bending.

The distances d1 (unit: mm, see FIG. 13A) between the arm center plane and the respective original points O are preferably less than the distances d2 between the arm center plane and the bases (points B) of the corresponding first excess portions Aca and Ada. This facilitates bending of only the portions of the arm nearer the respective side surfaces in relation to the original points O and reduces the risk of causing deformation of the recess during the bending. Here, the bases (points B) of the first excess portions Aca and Ada mean the bases of the first excess portion Aca and Ada on the journal J-facing surface, and the bases can be set on the outer edge of a journal-thrust portion. In this case, the distances d2 are, for example, the radius (mm) of the journal-thrust portion.

It is preferred that the inclination θa (°) at the original points O toward the parting plane is not more than the inclination θb (°) at the original points O toward the respective side surfaces of the arm. In this case, the first excess portions are made thinner, and the portion nearer the parting plane in relation to the original points O is unlikely to be deformed. Accordingly, only the portions of the arm nearer the respective side surfaces in relation to the original points O are bent easily. Thus, the bending is facilitated, and the risk of causing deformation of the recess during the bending is reduced.

As shown in FIG. 13B, steps may be made at the original points O, and the thickness may be decreased in a stepwise manner. In this case also, only the portions of the arm nearer the respective side surfaces in relation to the original points O are bent easily. Thus, the bending is facilitated, and the risk of causing deformation of the recess during the bending is reduced.

[Second Example of Process Flow]

The shape of a crankshaft and an example of process flow (second example of process flow) in a case in which the deformation of the first excess portions is carried out by crashing in the pressing step are described. The shape of the crankshaft and a process flow in the case of crashing are basically the same as the case of bending, which has been described above. In the following, therefore, descriptions of common points for both these cases will be omitted as appropriate, and points that differ from the case of bending will be mainly described.

When the first excess portions are crashed, the arm has a side surface shape different from the side surface shape achieved by bending. This will be described with reference to the drawings.

Figure 14A:
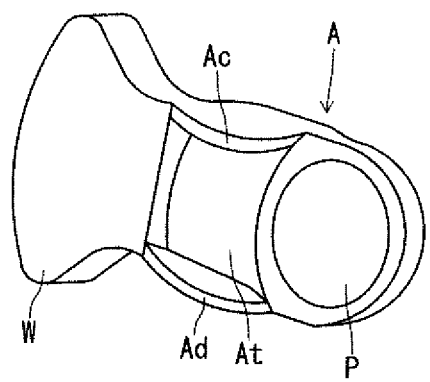
FIG. 14A is a perspective view schematically showing an example of the shape of the pin-facing surface of an arm in a case in which first excess portions are crashed.
Figure 14B:
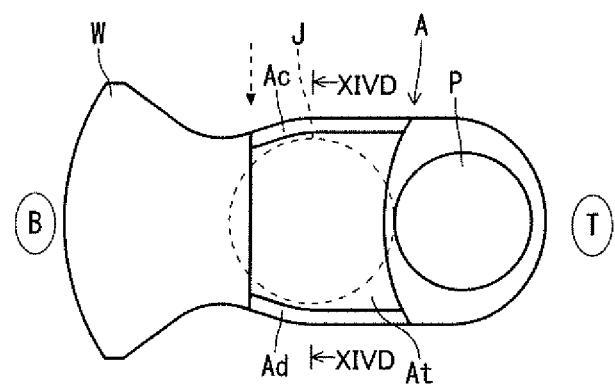
FIG. 14B is a view showing the pin-facing surface of the arm shown in FIG. 14A.
Figure 14C:
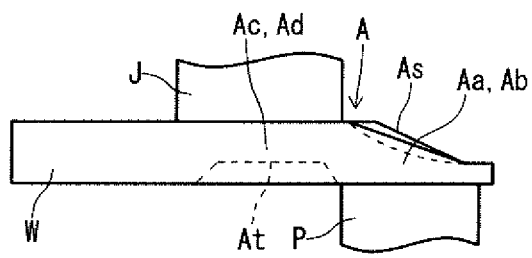
FIG. 14C is a view showing a side surface of the arm shown in FIG. 14A.
Figure 14D:
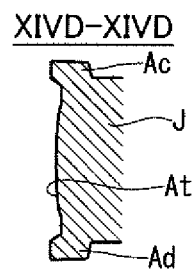
FIG. 14D is a sectional view of the arm along the line XIVD-XIVD in FIG. 14B.

FIGS. 14A to 14D are schematic diagrams showing an example of the shape of the pin-facing surface of an arm in the case in which the first excess portions are crashed. FIG. 14A is a perspective view, FIG. 14B is a view showing the pin-facing surface, FIG. 14C is a view showing the side surface, and FIG. 14D is a sectional view along the line XIVD-XIVD. The shape of the pin P-facing surface of the arm A shown in FIGS. 14A to 14D is the same as that of the arm A shown in FIGS. 2A to 2D. In the case of crashing, as shown in FIG. 14D, the side surfaces of the arm A in the region near the journal J are not inclined and are substantially parallel to the arm center plane.

Figure 15A:
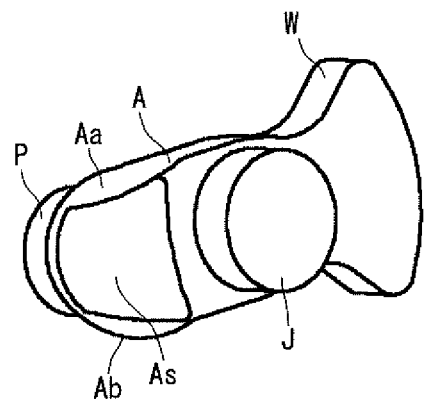
FIG. 15A is a perspective view schematically showing an example of the shape of a journal-facing surface of a preferred arm in a case in which first excess portions are crashed.
Figure 15B:
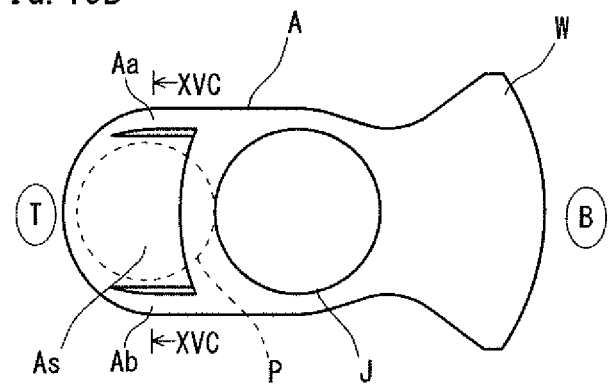
FIG. 15B is a view showing the journal-facing surface of the arm shown in FIG. 15A.
Figure 15C:
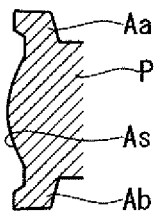
FIG. 15C is a sectional view of the arm along the line XVC-XVC in FIG. 15B.

FIGS. 15A to 15C are diagrams showing an example of the shape of the journal-facing surface of a preferred arm A in a case in which the first excess portions are crashed. FIG. 15A is a perspective view, FIG. 15B is a view showing the journal-facing surface, and FIG. 15C is a sectional view along the line XVC-XVC. The shape of the journal J-facing surface of the arm A shown in FIGS. 15A to 15C is the same as that of the arm A shown in FIGS. 3A to 3D. In the case of crashing, as shown in FIG. 15C, the side surfaces of the arm A in the region near the pin P are not inclined and are substantially parallel to the arm center plane.

Figure 16A:
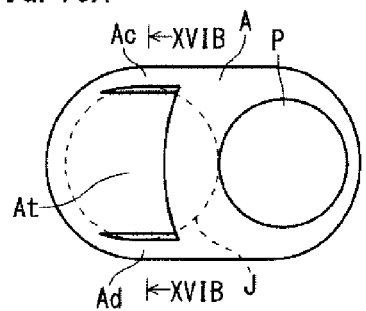
FIG. 16A is a schematic diagram showing an example of the shape of a pin-facing surface of a preferred non-weight arm in a case in which first excess portions are crashed.
Figure 16B:
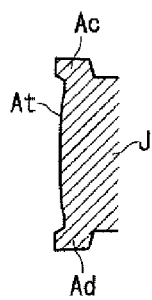
FIG. 16B is a sectional view of the arm along the line XVIB-XVIB in FIG. 16A.

FIGS. 16A and 16B are schematic diagrams showing an example of the shape of a preferred non-weight arm in a case in which the first excess portions are crashed. FIG. 16A is a view showing the pin-facing surface, and FIG. 16B is a sectional view along the line XVIB-XVIB. The shape of the pin P-facing surface of the arm A shown in FIGS. 16A and 16B is the same as that of the arm A shown in FIGS. 4A and 4B. In the case of crashing, as shown in FIG. 16B, the side surfaces of the arm A in the region near the journal J are not inclined and are substantially parallel to the arm center plane.

As with the case of the arm incorporating a weight shown in FIGS. 15A to 15D, it is preferred that the non-weight arm A has a recess in the journal-J surface, in the inner area As inside of the side portions Aa and Ab in the region near the pin P. In the case of crashing, the side surfaces of the non-weight arm A in the region near the journal J are not inclined and are substantially parallel to the arm center plane.

For the facilitation of deformation of the first excess portions by crashing, it is preferred that the arm before undergoing the pressing step has original points for the deformation of the excess portions, that is, for the crashing. The original points for the crashing can be configured in the same manner as the original points for the bending shown in FIGS. 13A and 13B.

In the case of crashing, it is preferred that the inclination θa (°) at the original points O toward the parting plane is not less than the inclination θb (°) at the original points O toward the side surfaces of the arm (see FIG. 13A). In this case, the first excess portions are made thicker, and the portions of the arm nearer the side surfaces in relation to the original points O are unlikely to be deformed to bulge toward the journal. Accordingly, it is possible to certainly cause the portions of the arm nearer the side surfaces in relation to the original points O to bulge toward the pin.

Figure 17A:
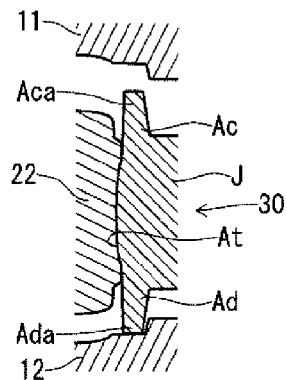
FIG. 17A is a sectional view of an arm in a region near the journal at a time when a second die is abutted on the arm in an example of process flow of the pressing step (second example of process flow) to crash first excess portions.

FIGS. 17A to 18B are schematic diagrams showing an example of a process flow to crash the first excess portions in the pressing step. FIGS. 17A and 17B are sectional views of the portion of an arm near the journal. FIG. 17A shows the time when the second die is abutted on the arm, and FIG. 17B shows the time when the pressing step has been finished. FIGS. 17A and 17B show the forged blank with no flash 30, the first pair of dies 11 and 12, and the second die 22.

Figure 18A:
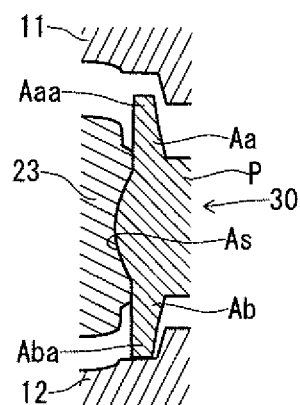
FIG. 18A is a sectional view of the arm in a region near the pin at the time when the second die is abutted on the arm in the second example of process flow.
Figure 18B:
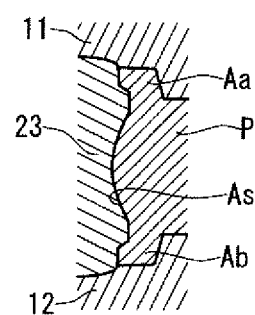
FIG. 18B is a sectional view of the arm in the region near the pin at the time when the pressing has been finished along with the second example of process flow.

FIGS. 18A and 18B are sectional views of the portion of the arm near the pin. FIG. 18A shows the time when the second die is abutted on the arm, and FIG. 18B shows the time when the pressing step has been finished. FIGS. 18A and 18B show the forged blank with no flash 30, the first pair of dies 11 and 12, and the third die 23.

Figure 9A:
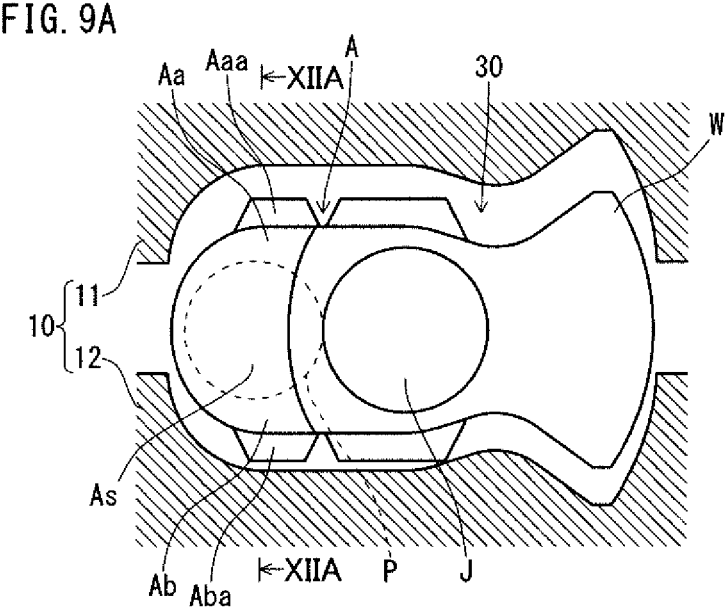
FIG. 9A is a schematic diagram showing a journal-facing surface of the arm at the time when the second die is abutted on the arm in the first example of process flow.
Figure 9B:
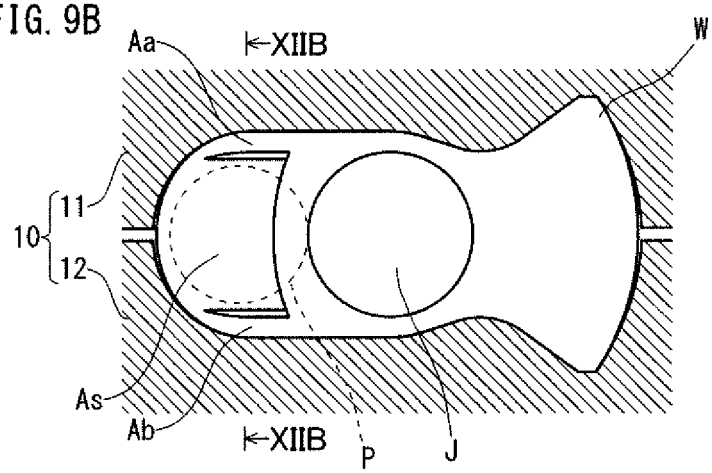
FIG. 9B is a schematic diagram showing the journal-facing surface of the arm at the time when the pressing has been finished along with the first process flow.

The basic configuration of the second example of process flow for the crashing shown in FIGS. 17A to 18B is the same as the basic configuration of the process flow for the bending (the first example of process flow). Therefore, the pin-facing surface in the process flow for the crashing is shown in the same drawings as FIGS. 8A and 8B, and the drawings to show the pin-facing surface in the process flow for the crashing are omitted. Also, the journal-facing surface in the process flow for the crashing is shown in the same drawings as FIGS. 9A and 9B, and the drawings to show the journal-facing surface in the process flow for the crashing are omitted. Further, a side surface of the arm in the process flow for the crashing is shown in the same drawings as FIGS. 10A and 10B, and the drawings to show the side surface in the process flow for the crashing are omitted. FIG. 17A is a sectional view along a line corresponding to the line XIA-XIA in FIG. 8A, and FIG. 17B is a sectional view along a line corresponding to the line XIIA-XIIA in FIG. 8B. FIG. 18A is a sectional view along a line corresponding to the line XIIA-XIIA in FIG. 9A, and FIG. 18B is a sectional view along a line corresponding to the line XIIB-XIIB in FIG. 9B.

In the case of crashing, also, the upper die 11 and the lower die 12, which form the first pair of dies 10, each have an impression. The impressions reflect the shapes of the side portions of an arm incorporating a weight in the region near the journal so as to crash the first excess portions. The portions of the impressions contributing to the crashing of the first excess portions are not inclined and are substantially parallel to the parting plane. When the arm incorporating a weight further has second excess portions, when a non-weight arm has first excess portions, or when the non-weight arm further has second excess portions, the portions of the impressions contributing to the crashing of the excess portions are not inclined and are substantially parallel to the parting plane.

Figure 17B:
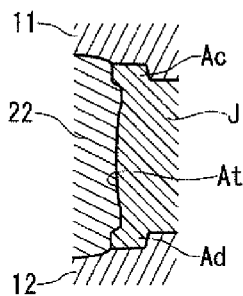
FIG. 17B is a sectional view of the arm in the region near the journal at a time when the pressing has been finished along with the second example of process flow.

While the forged blank with no flash 30 is pressed by the first pair of dies 10, as shown in FIG. 17B, the first excess portions Aca and Ada are crashed. Thereby, the first excess portions Aca and Ada are formed into the shape in conformity with the impressions of the first pair of dies 10, and thus, the first excess portions Aca and Ada are caused to bulge toward the pin P. Consequently, the side portions Ac and Ad of the arm in the region near the journal J are thickened. Accordingly, the produced crankshaft has an arm having thick side portions Ac and Ad in the region near the journal J.

When the arm incorporating a weight has second excess portions, the second excess portions are crashed by the first pair of dies 10 during the pressing. Thereby, the second excess portions Aaa and Aba are formed into the shape in conformity with the impressions of the first pair of dies 10, and thus, the second excess portions Aaa and Aba are caused to bulge toward the journal J. Consequently, the side portions Aa and Ab of the arm in the region near the pin P are thickened.

When a non-weight arm has first excess portions, the first excess portions are crashed by the first pair of dies 10 during the pressing step. Thereby, the first excess portions are caused to bulge toward the pin, and the side portions of the arm in the region near the journal J are thickened. When the non-weight arm further has second excess portions, the second excess portions are crashed by the first pair of dies 10 during the pressing step. Thereby, the second excess portions are caused to bulge toward the journal J, and the side portions of the arm in the region near the pin P are thickened.

In the arm A shown in FIGS. 14A to 14D, the range where the recess is formed in the pin P-facing surface is the same as the range where the thick side portions Ac and Ad in the region near the journal J extend. The range where the recess is formed in the pin P-facing surface may be different from the range where the thick side portions Ac and Ad in the region near the journal J extend. In order to ensure stable deformation by the crashing, it is preferred that the recess is formed in the pin P-facing surface, in a range corresponding to the range where the thick side portions Ac and Ad in the region near the journal J extend. The presence of the recess very close to the side portions at the time of crashing facilitates the deformation of only the portions nearer the side surfaces in relation to the recess, and specifically, only the side portions and the first excess portions.

4. Preferred Embodiments

When a crankshaft including a plurality of arms incorporating a weight (which will hereinafter be referred to as "weight-incorporating arms") is to be produced as a final product, all of the weight-incorporating arms of the forged blank may have first excess portions, or alternatively, only some of the weight-incorporating arms of the forged blank may have first excess portions. Which of the weight-incorporating arms should have first excess portions can be determined, for example, based on in what portions of the crankshaft the arms are required to have flexural rigidity, torsional rigidity and stiffness.

When the forged blank for the crankshaft (final product) including a plurality of weight-incorporating arms has second excess portions in the weight-incorporating arms, the second excess portions may be attached to all of the weight-incorporating arms, or alternatively may be attached to only some of the weight-incorporating arms. Also, the second excess portions may be disposed such that one weight-incorporating arm have both the first excess portions and the second excess portions as shown in FIG. 5A. Alternatively, the second excess portions may be attached to one or more weight-incorporating arms different from those having first excess portions. Which of the weight-incorporating arms should have second excess portions can be determined, for example, based on in what portions of the crankshaft the arms are required to have flexural rigidity, torsional rigidity and stiffness.

When a forged blank for a crankshaft (final product) including a plurality of arms incorporating no weight (non-weight arms) has first excess portions, the first excess portions may be attached to all of the non-weight arms, or alternatively may be attached to only some of the non-weight arms. Which of the non-weight arms should have first excess portions can be determined, for example, based on in what portions of the crankshaft the arms are required to have flexural rigidity, torsional rigidity and stiffness.

When the forged blank for the crankshaft (final product) including a plurality of non-weight arms has second excess portions in the non-weight arms, the second excess portions may be provided to all of the non-weight arms, or alternatively may be provided to only some of the non-weight arms. Also, the second excess portions may be disposed such that one weight-incorporating arm have both the first excess portions and the second excess portions as shown in FIG. 7A. Alternatively, the second excess portions may be attached to one or more non-weight arms different from those having first excess portions. Which of the non-weight arms should have second excess portions can be determined, for example, based on in what portions of the crankshaft the arms are required to have flexural rigidity, torsional rigidity and stiffness.

A weight-incorporating arm may have first excess portions (Aca and Ada) in both side portions in the region near the journal (side portions Ac and Ad) as with the cases of the examples of the shape and the example of process flow described above, or alternatively may have a first excess portion in either of the side portions in the region near the journal (side portion Ac or Ad). Even when the weight-incorporating arm has a first excess portion only in one of the side portions in the region near the journal (side portion Ac or Ad), by causing the first excess portion to bulge toward the pin, the weight-incorporating arm after undergoing the pressing step obtains a thick portion in one of the side portions. Thus, stiffness is ensured while weight reduction is achieved. In which of the side portions in the region near the journal the arm should have a first excess portion can be determined, for example, based on in what portion of the arm is required to have flexural rigidity, torsional rigidity and stiffness.

When the weight-incorporating arm has one or more second excess portions, the second excess portions (Aaa and Aba) may be disposed in both side portions in the region near the journal (side portions Aa and Ab) as with the cases of the examples of the shape and the examples of process flow described above, or alternatively, one second excess portion may be disposed in either of the side portions in the region near the pin (side portion Aa or Ab). Even when the weight-incorporating arm has a second excess portion only in one of the side portions in the region near the pin (side portion Aa or Ab), by causing the second excess portion to bulge toward the journal, the weight-incorporating arm after undergoing the pressing step obtains a thick portion in one of the side portions. Thus, stiffness is ensured while weight reduction is achieved. In which of the side portions in the region near the pin the arm should have a second excess portion can be determined, for example, based on in what portion of the arm is required to have flexural rigidity, torsional rigidity and stiffness.

When a non-weight arm has one or more first excess portions, the first excess portions (Aca and Ada) may be disposed in both side portions in the region near the journal (side portions Ac and Ad) as with the cases of the examples of the shape and the examples of process flow described above, or alternatively, one first excess portion may be disposed in either of the side portions in the region near the journal (side portion Ac or Ad). Even when the non-weight arm has a first excess portion only in one of the side portions in the region near the journal (side portion Ac or Ad), by causing the first excess portion to bulge toward the pin, the non-weight arm after undergoing the pressing step obtains a thick portion in one of the side portions. Thus, stiffness is ensured while weight reduction is achieved. In which of the side portions in the region near the journal the arm should have a first excess portion can be determined, for example, based on in what portion of the arm is required to have flexural rigidity, torsional rigidity and stiffness.

When the non-weight arm has one or more second excess portions, the second excess portions (Aaa and Aba) may be disposed in both side portions in the region near the journal (side portions Aa and Ab) as with the cases of the examples of the shape and the examples of process flow as described above, or alternatively, one second excess portion may be disposed in either of the side portions in the region near the pin (side portion Aa or Ab). Even when the non-weight arm has a second excess portion only in one of the side portions in the region near the pin (side portion Aa or Ab), by causing the second excess portion to bulge toward the journal, the non-weight arm after undergoing the pressing step obtains a thick portion in one of the side portions. Thus, stiffness is ensured while weight reduction is achieved. In which of the side portions in the region near the pin the arm should have a second excess portion can be determined, for example, based on in what portion of the arm is required to have flexural rigidity, torsional rigidity and stiffness.

As described above, a weight-incorporating arm may have first excess portions Aca and Ada in the side portions Ac and Ad in the region near the journal. In this case, in the pressing step, it is preferred that the pin P-facing surface of the weight-incorporating arm A, except at least the side portions Ac and Ad in the region near the journal J, is held by the second die 22 abutted thereagainst as shown in FIGS. 10A to 11B. This ensures precise shaping of the recess in the pin P-facing surface. When the forged blank to undergo the pressing step has flash as with the cases of the second and the third examples of process, however, the second die 22 cannot be used.

Alternatively, the weight-incorporating arm A may have a first excess portion (Aca or Ada) in only either one of the side portions Ac or Ad in the region near the journal. In this case, it is preferred that the pin P-facing surface of the weight-incorporating arm A, except at least the side portion Ac or Ad in the region near the journal J from which the first excess portion protrudes, is held by the second die 22 abutted thereagainst. This ensures precise shaping of the recess in the pin P-facing surface.

In a case in which the second die 22 is used in the pressing step, it is preferred that the second die 22 is moved in the pressing direction by the first pair of dies 10 along with the pressing performed by the first pair of dies 10 to be kept in a position to press the arm A. This ensures more precise shaping of the recess in the pin P-facing surface.

Regarding a weight-incorporating arm, it is preferred that one or more second excess portions are further formed in the die forging step, and in the pressing step, the second excess portion(s) is/are deformed by the first pair of dies, thereby thickening either one or both of the side portions (Aa and Ab) in the region near the pin. This permits further weight reduction with maintenance of stiffness. In this case, for precise shaping of the recess in the journal J-facing surface, it is preferred that the above-described third die is used. When the forged blank to undergo the pressing step has flash as with the cases of the second and the third examples of process, however, the third die cannot be used.

Regarding a non-weight arm, it is preferred that one or more first excess portions are further formed in the die forging step, and in the pressing step, the first excess portion(s) is/are deformed by the first pair of dies, thereby thickening either one or both of the side portions (Ac and Ad) in the region near the journal. This permits further weight reduction with maintenance of stiffness. In this case, for precise shaping of the recess in the pin P-facing surface, it is preferred that the above-described fourth die is used. When the forged blank to undergo the pressing step has flash as with the cases of the second and the third examples of process, however, the fourth die cannot be used.

Regarding the non-weight arm, also, it is preferred that one or two second excess portions are further formed in the die forging step, and in the pressing step, the second excess portion(s) is/are deformed by the first pair of dies, thereby thickening either one or both of the side portions (Aa and Ab) in the region near the pin. This permits further weight reduction with maintenance of stiffness. In this case, for precise shaping of the recess in the journal J-surface, it is preferred that the above-described fifth die is used. When the forged blank to undergo the pressing step has flash as with the cases of the second and the third examples of process, however, the fifth die cannot be used.

When the second to the fifth dies are used, these dies are abutted on the corresponding surfaces of the arm A. The second to the fifth dies are only to hold the surfaces of the arm A and not to push the surfaces forward. Therefore, only a small amount of power is necessary to press the second to the fifth dies.

The above-described first and second examples of process flow are intended for crankshafts that are to be mounted in four-cylinder engines wherein the decentering directions of the pins are equally shifted by 180° with respect to each arm. In such a case in which all of the pins are equally shifted by 180°, all of the arms are pressed by the first pair of dies from a direction perpendicular to the pin decentering direction. In this case, the pressing direction by the first pair of arms is also perpendicular to the axis of the crankshaft.

The pressing direction by the first pair of dies is not limited to the direction perpendicular to the pin decentering direction. For example, a crankshaft to be mounted in a three-cylinder engine wherein the decentering directions of the pins are equally shifted by 120° or 60°. In producing such a crankshaft having pins that are not equally shifted by 180°, the placement angles of the pins may be adjusted in an additional twisting step. Alternatively, the placement angles of the pins may be adjusted in a finish pressing step. For example, when the adjustment of the placement angles of the pins is performed in a twisting step in the first example of process, with respect to some of the arms, the pressing direction by the first pair of dies in the pressing step will not correspond to the direction perpendicular to the pin decentering direction. This case will be described below.

Figure 19A:
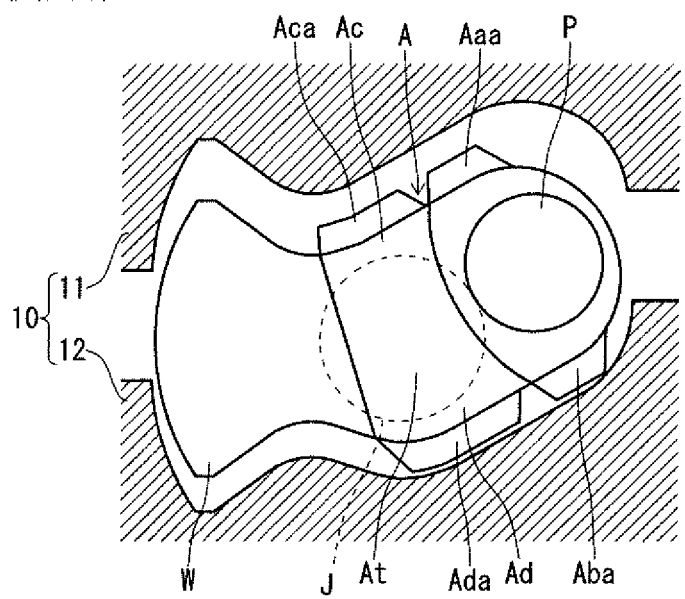
FIG. 19A is a schematic diagram showing a pin-facing surface of an arm before undergoing pressing in a case in which a pressing direction by a first pair of dies is not perpendicular to a pin decentering direction.
Figure 19B:
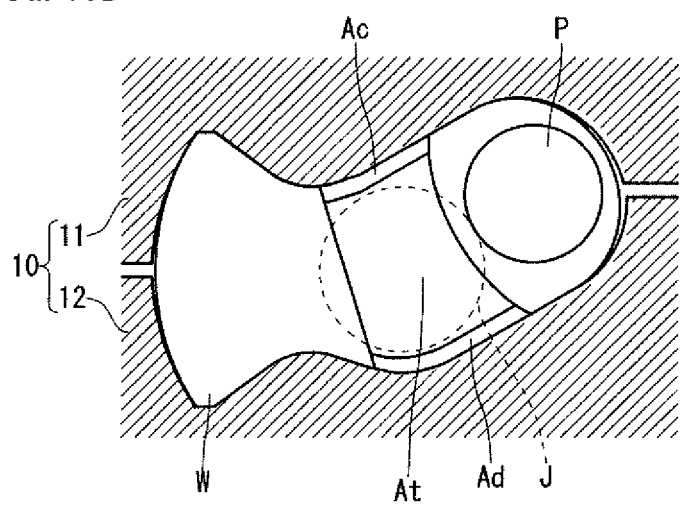
FIG. 19B is a schematic diagram showing the pin-facing surface of the arm on completion of the pressing in a case in which the pressing direction by the first pair of dies is not perpendicular to the pin decentering direction.

FIGS. 19A and 19B are schematic diagrams of a pin-facing surface of an arm when the pressing direction by the first pair of dies is not perpendicular to the pin decentering direction. FIG. 19A shows a state before the pressing step, and FIG. 19B shows a state on completion of the pressing step. A crankshaft employing the arm A shown in FIGS. 19A and 19B is to be mounted in a three-cylinder engine, and in the crankshaft, the placement angles of the pins are shifted equally by 120°. Therefore, in the pressing step, the decentering direction of some of the pins is inclined from the horizontal direction by 30°. Accordingly, with respect to the arms adjacent to these pins, the pressing direction by the first pair of dies 10 (vertical direction in FIGS. 19A and 19B) is shifted from the pin decentering direction by 60°.

The forged crankshaft production method according to the present embodiment is applicable also to such a case in which the pressing direction by the first pair of dies 10 is not perpendicular to the decentering direction of the pin P. The first excess portions (Aca, Ada) and the second excess portions (Aaa, Aba) are deformed by the first pair of dies 10 to thicken the both side portions of the arm. There is no limit to the pressing direction by the first pair of dies 10 as long as the first pair of dies 10 can deform the first excess portions (Aca, Ada) and the second excess portions (Aaa, Aba) to thicken the both side portions of the arm.

INDUSTRIAL APPLICABILITY

The present invention is efficiently utilized in a method for producing a forged crankshaft to be mounted in a reciprocating engine.

LIST OF REFERENCE SYMBOLS

1: forged crankshaft
J, J1 to J5: journal
P, P1 to P4: pin
Fl: flange
A, A1 to A8: crank arm
W, W1 to W8: counterweight
Aa, Ab: side portion of an arm in a region near a pin
Aaa, Aba: second excess portion
Ac, Ad: side portion of an arm in a region near a journal
Aca, Ada: first excess portion
As: inner area of a journal-facing surface of an arm, inside of side portions
At: inner area of a pin-facing surface of an arm, inside of side portions
10: first pair of dies
11: upper die
11a, 11b: inclined surface
12: lower die
12a, 12b: inclined surface
22: second die
23: third die
26: jig
30: forged blank with no flash

The invention claimed is:

1. A method for producing a forged crankshaft including journals serving as a center of rotation, pins decentered from the journals, crank arms connecting the journals and the pins, and counterweights integrated with some or all of the crank arms, the method comprising:

a die forging step of forming a forged blank having a crankshaft shape by die forging; and a pressing step of pressing the forged blank by a pair of first dies; wherein:

the forged blank includes first excess portions attached to some or all of the crank arms each incorporating a counterweight, each of the first excess portions protruding from a side portion of the crank arm which the first excess portion is attached to, in a region near the journal adjacent to the crank arm; and in the pressing step, the first excess portions are deformed by the first dies such that each of the first excess portions bulges toward the pin adjacent to the crank arm which the first excess portion is attached to.

2. The method for producing a forged crankshaft according to claim 1, wherein:

the first dies include inclined surfaces to face the first excess portions; and in the pressing step, the first excess portions are deformed along the inclined surfaces.

3. The method for producing a forged crankshaft according to claim 1, further comprising a trimming step of removing flash from the forged blank; wherein:

in the die forging step, a forged blank with flash is formed;

in the trimming step, a forged blank with no flash is formed from the forged blank with flash; and in the pressing step, the forged blank with no flash is pressed.

4. The method for producing a forged crankshaft according to claim 3, wherein in the pressing step, a pin-facing surface of each of the crank arms which the first excess portions are attached to, except at least the side portion in the region near the journal, is held by a second die abutted thereagainst.

5. The method for producing a forged crankshaft according to claim 4, wherein in the pressing step, the second die is moved along with pressing performed by the first dies to be kept in a position to hold the crank arm.

6. The method for producing a forged crankshaft according to claim 1, wherein in each of the crank arms on which the first excess portions are attached to, the first excess portions protrude from both side portions of the crank arm, in the region near the journal.

7. The method for producing a forged crankshaft according to claim 1, wherein the pressing step is performed during a coining step of correcting a shape of the crankshaft by pressing by use of a pair of dies.

8. The method for producing a forged crankshaft according to claim 1, wherein:

the forged blank includes second excess portions attached to some or all of the crank arms each incorporating a counterweight, each of the second excess portions protruding from a side portion of the crank arm which the second excess portion is attached to, in a region near the pin adjacent to the crank arm; and in the pressing step, the second excess portions are deformed by the first dies such that each of the second excess portions bulges toward the journal adjacent to the crank arm which the second excess portion is attached to.

9. The method for producing a forged crankshaft according to claim 8, wherein in each of the crank arms which the second excess portions are attached to, the second excess portions protrude from both side portions of the crank arm, in the region near the pin adjacent to the crank arm.

* * * * *